US011586427B2

(12) United States Patent
Mueck

(10) Patent No.: US 11,586,427 B2
(45) Date of Patent: Feb. 21, 2023

(54) MULTIRADIO INTERFACE FOR SOFTWARE RECONFIGURATION

(71) Applicant: Apple Inc., Cupertino, CA (US)

(72) Inventor: Markus Dominik Mueck, Unterhaching (DE)

(73) Assignee: Apple Inc., Cupertino, CA (US)

(*) Notice: Subject to any disclaimer, the term of this patent is extended or adjusted under 35 U.S.C. 154(b) by 167 days.

(21) Appl. No.: 16/632,716

(22) PCT Filed: Jul. 17, 2018

(86) PCT No.: PCT/US2018/042520
§ 371 (c)(1),
(2) Date: Jan. 21, 2020

(87) PCT Pub. No.: WO2019/018418
PCT Pub. Date: Jan. 24, 2019

(65) Prior Publication Data
US 2021/0165646 A1      Jun. 3, 2021

Related U.S. Application Data

(60) Provisional application No. 62/535,581, filed on Jul. 21, 2017.

(51) Int. Cl.
*H04M 3/00*      (2006.01)
*G06F 8/65*      (2018.01)
(Continued)

(52) U.S. Cl.
CPC ............. *G06F 8/65* (2013.01); *H04B 1/0003* (2013.01); *H04L 67/34* (2013.01); *H04M 1/72406* (2021.01)

(58) Field of Classification Search
CPC ...... G06F 8/65; G06F 11/0796; G06F 12/023; G06F 13/409; G06F 2212/251;
(Continued)

(56) References Cited

U.S. PATENT DOCUMENTS 6,070,012 A * 5/2000 Eitner .................... G06F 8/656
717/168
8,495,616 B2 * 7/2013 Fan ..................... H04L 41/0856
717/173
(Continued)

OTHER PUBLICATIONS

ETSI EN 303 146-1 V1.2.1, Reconfigurable Radio Systems (RRS); Mobile Device Information Models and Protocols; Part 1: Multiradio Interface (MURI), published Nov. 2015, pp. 1-34.*
(Continued)

*Primary Examiner* — Stephen M D Agosta
(74) *Attorney, Agent, or Firm* — Fay Kaplun & Marcin, LLP

(57) ABSTRACT

An apparatus of a user equipment (UE) comprises a memory to store a Unified Radio Application and to store one or more configuration parameters for the Unified Radio Application, and one or more baseband processors to receive a radio application update from a remote server, and to update the Unified Radio Application via a Multiradio Interface (MURI) "updateRadioApps" operation with the received radio application update. One or more of the configuration parameters are maintained in the memory after the update.

12 Claims, 6 Drawing Sheets

(51) Int. Cl.
*H04B 1/00* (2006.01)
*H04L 67/00* (2022.01)
*H04M 1/72406* (2021.01)

(58) Field of Classification Search
CPC .............. G06F 9/44505; G06F 1/1658; H04M
1/72406; H04M 3/42272; H04M 3/543;
H04M 7/123; H04M 7/1235; H04M
7/0027; H04B 1/0003; H04B 7/2606;
H04B 1/0475; H04B 2001/0425; H04B
7/0697; H04B 1/3805; H04L 67/34;
H04L 67/12; H04L 67/2842; H04L
12/4633; H04L 12/6418; H04L 12/66;
H04W 88/06; H04W 84/12; H04W 84/18;
H04W 76/10
See application file for complete search history.

(56) References Cited

U.S. PATENT DOCUMENTS

| | | | | |
|---|---|---|---|---|
| 9,537,956 | B1* | 1/2017 | Sibenac | H04W 4/02 |
| 9,616,896 | B1* | 4/2017 | Letwin | B60W 50/082 |
| 9,946,531 | B1* | 4/2018 | Fields | B60W 30/06 |
| 11,089,595 | B1* | 8/2021 | Frigon | H01Q 21/065 |
| 2004/0068721 | A1* | 4/2004 | O'Neill | G06F 8/65 |
| | | | | 717/168 |
| 2005/0097543 | A1* | 5/2005 | Hirayama | G06F 8/65 |
| | | | | 717/168 |
| 2008/0046174 | A1* | 2/2008 | Johnson | G01C 21/28 |
| | | | | 701/533 |
| 2010/0115528 | A1* | 5/2010 | Piipponen | H04B 1/0003 |
| | | | | 455/73 |
| 2011/0026432 | A1* | 2/2011 | Gruber | H04W 72/1215 |
| | | | | 370/254 |
| 2011/0075596 | A1* | 3/2011 | Moreira | H04W 72/02 |
| | | | | 370/310 |
| 2013/0295986 | A1* | 11/2013 | Mueck | H04W 48/18 |
| | | | | 455/552.1 |
| 2015/0052515 | A1* | 2/2015 | Choi | G06F 8/654 |
| | | | | 717/174 |
| 2015/0089489 | A1* | 3/2015 | Sarkar | G06F 8/656 |
| | | | | 717/173 |
| 2015/0230044 | A1* | 8/2015 | Paun | H04L 67/12 |
| | | | | 455/41.2 |
| 2015/0326434 | A1* | 11/2015 | Choi | G06F 8/654 |
| | | | | 709/221 |
| 2016/0198018 | A1* | 7/2016 | Choi | H04W 8/22 |
| | | | | 370/329 |
| 2017/0024201 | A1* | 1/2017 | Diedrich | H04L 67/34 |
| 2017/0147314 | A1* | 5/2017 | Choi | H04W 48/18 |
| 2017/0273068 | A1* | 9/2017 | Choi | H04B 1/0014 |
| 2019/0007811 | A1* | 1/2019 | Choi | H04W 4/50 |
| 2019/0089386 | A1* | 3/2019 | Choi | H04B 1/00 |
| 2020/0288301 | A1* | 9/2020 | Choi | H04W 8/005 |
| 2020/0336900 | A1* | 10/2020 | Mueck | H04W 12/03 |
| 2022/0030662 | A1* | 1/2022 | Mueck | H04W 88/06 |

OTHER PUBLICATIONS

Etsi: "Reconfigurable Radio Systems (RRS); Mobile Device Information Models and Protocols; Part 1: Multiradio Interface (MRI) 1.1.2", Jul. 31, 2015, figures 4.1, 8.2.

Etsi: "Reconfigurable Radio Systems (RRS); Use Cases and Scenarios for Software Defined Radio (SDR) Reference Architecture for Mobile Device", vol. RRS 1, No. V1.1.1, Apr. 1, 2011, figure 1.

Etsi: "Reconfigurable Radio Systems (RRS); Mobile Device (MD) information models and protocols; Part 1: Multiradio Interface (MURI) V1.2.7", Mar. 30, 2018, figures 4.1, 8.2.

\* cited by examiner

MULTIRADIO INTERFACE FOR SOFTWARE RECONFIGURATION

CROSS-REFERENCE TO RELATED APPLICATIONS

The present application claims the benefit of U.S. Provisional Application No. 62/535,581 filed Jul. 21, 2017. Said Application No. 62/535,581 is hereby incorporated herein by reference in its entirety.

BACKGROUND

Software defined radio is a concept in which fixed hardware radio components may be selectively reparameterized or replaced with software components in order to provide reconfiguration of the radio. A Software (SW) Reconfiguration architecture has been proposed that includes four distinct interfaces. These interfaces include a Multiradio Interface (MUM) that provides mechanisms for software provision, software installation, software execution, and software de-installation. No mechanism, however, has been proposed to provide a software update, or to maintain old configuration data that may be used to implement software updates and/or reconfiguration.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
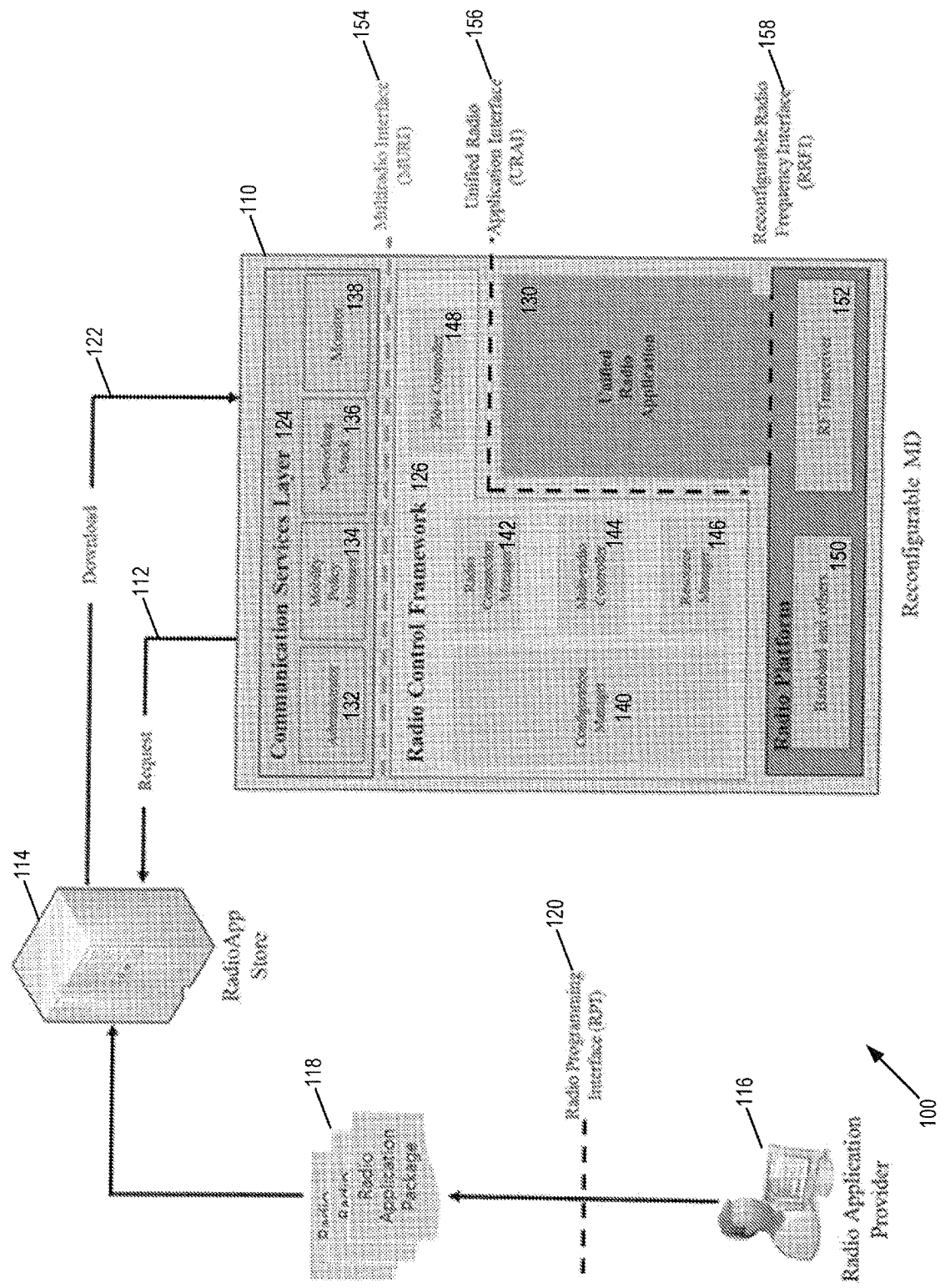
FIG. 1 is a diagram of a system to reconfigure a reconfigurable mobile device in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of a system to reconfigure a reconfigurable mobile device in accordance with one or more embodiments will be discussed. As shown in FIG. 1, system 100 may include a reconfigurable mobile device (MD) 110 or user equipment (UE). The terms mobile device and user equipment may be utilized interchangeably, and the scope of the claimed subject matter is not limited in this respect. In order to provide reconfiguration of the reconfigurable MD 110, system 100 may utilize RadioApps comprising applications, or Radio Applications, that extend or modify existing radio features of the reconfigurable MD 110 and further may provide solutions for technical, certification, and/or security requirements for the reconfigurable MD 110. In one or more embodiments, RadioApps may be used to optimize the operation of a reconfigurable MD 110 in general or for usage in a specific market with special needs. For example, RadioApps may be used to optimize the operation of a reconfigurable MD 110 in response to the introduction of new features on the network side as such features evolve in ongoing future releases of the Third Generation Partnership Project (3GPP) standard. In other embodiments, an optimum configuration may be identified to meet power efficiency, for example new power-efficient modulation and coding schemes, predictable Quality of Service (QoS) and/or other requirements. In another example, RadioApps may be utilized to add new mechanisms that take into account specific characteristics of the usage environment such as specific interference properties in a factory environment in which reconfigurable MD 110 is deployed. In yet another example, proprietary features and/or extensions may be implemented that are not yet part of a 3GPP standard, for example device-to-device communication. In some embodiments, entire radio access technologies (RATs) may be replaced in a reconfigurable MD 110 where sufficient computational resources are available. The above are merely some examples of how RadioApps may be used to reconfigure a reconfigurable MD 110, and the scope of the claimed subject matter is not limited in these respects.

As shown in FIG. 1, a reconfigurable MD 110 may send a request to a RadioApp store server 114. One or more RadioApps may be provided to the RadioApp store server 114 by a Radio Application Provider 116 which may send one or more Radio Application Packages 118 containing one or more RadioApps via a Radio Programming Interface (RPI) 120. The RadioApp store server 114 may then transmit one or more RadioApps to reconfigurable MD 110 via download 122.

In one or more embodiments, reconfigurable MD 110 may execute the Radio Application (RA) code consisting of various functional blocks of which the granularities might be all different depending upon hardware platform vendors and/or depending on the features provided by mobile device manufacturers. The manufacturer and/or a third-party software manufacturer may develop the entire or partial RA code using standard programming interfaces. A modular software approach may be utilized in order to maximize the reusability of software components. Furthermore, the evolution of various radio access technologies (RATs) may be supported by adding and/or replacing functional blocks on a given hardware platform of reconfigurable MD 110.

In one or more embodiments, the architecture of reconfigurable MD 110 may include a Communication Services Layer (CSL) 124, a Radio Control Framework (RCF) 126, a Radio Platform (RP) 128, and a Unified Radio Application (URA) 130. The Communication Services Layer 124 provides functionalities for installation, de-installation, selection, and/or configuration of software components and the management of the data flows. Communication Services Layer 124 may include functionalities such as an Administrator 132, a Mobility Policy Manager 134, a Networking Stack 136, and a Monitor 138. The Radio Control Framework 126 manages the software execution through a number of functionalities. The Radio Control Framework 126 may include functionalities such as a Configuration Manager 140, a Radio Connection Manager 142, a Multiradio Controller 144, a Resource Manager 146, and a Flow Controller 148. The Radio Platform 128 may include a Baseband processor and other circuits 150, and a radio-frequency (RF) Transceiver 152. The Unified Radio Application 130 represents the software downloaded and installed on the target Radio Platform 128. The Radio Control Framework (RCF) 126 may control execution of the Unified Radio Application 130, although the scope of the claimed subject matter is not limited in this respect.

In one or more embodiments, the Unified Radio Application 130 is the software component or components of one or more Radio Access Technologies (RATs) implemented by RF Transceiver 152 such as WiFi operating in accordance with an Institute of Electrical and Electronics Engineers (IEEE) 802.11 standard or the like, Bluetooth operating in accordance with a Bluetooth Special Interest Group (SIG) standard, or cellular operating in accordance with a Third Generation Partnership Project (3GPP) or a European Telecommunication Standards Institute (ETSI) standard, an so on, although the scope of the claimed subject matter is no limited in this respect. The software, instructions, or code of Unified Radio Application 130 may be executed on any resources of the reconfigurable MD 110, for example on a baseband processor 150, a field-programmable gate array (FPGA), a digital signal processor (DSP), and so on, and the scope of the claimed subject matter is not limited in this respect.

In one or more embodiments, system 100 and/or reconfigurable MD 110 may utilize four interfaces to implement software defined radio configuration and/or reconfiguration of reconfigurable MD 110. A Multiradio Interface (MURI) 154 may be used for interfacing the Communication Services Layer 124 and Radio Control Framework 126. In particular, as discussed in further detail herein, MURI 154 of reconfigurable MD 110 may be adapted to provide a mechanism to implement software updates, optionally while maintaining old configuration data, without requiring full de-installation and installation of a given software component. A Unified Radio Application Interface (URAI) 156 may be utilized to interface Radio Control Framework 126 and Unified Radio Application 130. A Reconfigurable Radio Frequency Interface (RRFI) 148 may be utilized to interface the United Radio Application (130) and the RF Transceiver 152. In addition, the Radio Programming Interface (RPI) 120 may be implemented to allow for independent and uniform production of Radio Applications. In general, the chipset of the reconfigurable MS 110 exists below the dotted line of MURI 154, and the chipset interface exists above the dotted line of MURI 154, although the scope of the claimed subject matter is not limited in this respect. An example of the interconnection between MURI 154 and CSL 124 and RCF 126 is shown in and described with respect to FIG. 2, below.

Figure 2:
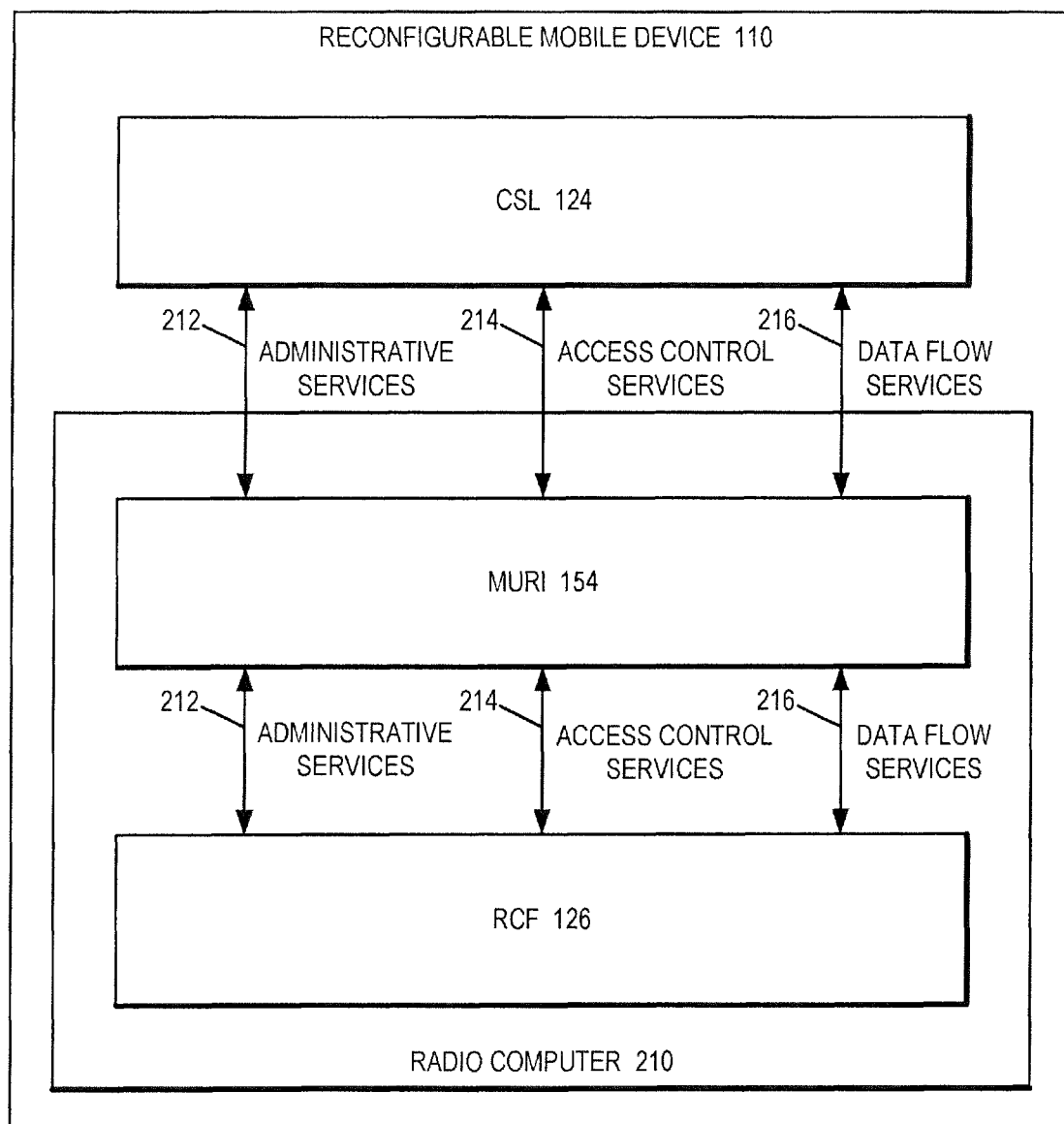
FIG. 2 is a diagram of a multiradio interface (MURI) of a reconfigurable mobile device in accordance with one or more embodiments.

Referring now to FIG. 2, a diagram of a multiradio interface (MURI) of a reconfigurable mobile device in accordance with one or more embodiments will be discussed. FIG. 2 illustrates how Control Services Layer (CSL) 124 and Radio Control Framework (RCF) 126 interact with each other using Multiradio Interface (MURI) 154. MURI 154 and RCF 126 may be implemented on a Radio Computer 210 of reconfigurable mobile device (MD) 110. In one or more embodiments, reconfigurable MD 110 may include various services to provide interconnection between CSL 124 and RCF 126 via MURI 154. Such services may include Administrative Services 212, Access Control Services 214, and/or Data Flow Services 216. In one or more embodiments, the Administrative Services 212 may be extended to provide software updates for reconfigurable MD 110 without losing any parameters of a previous configuration, or optionally while maintaining at least a subset of parameters of a previous configuration. Administrative Services 212 are used by a device configuration application such as Administrator 132 of CSL 124 to install and/or uninstall a new Unified Radio Application (URA) 130 into or from the reconfigurable MD 110 and/or to create or delete an instance of the URA 130. Installation and/or loading of the URA 120 may take place at start-up time of the reconfigurable MD 110 to set up the network connection and/or during run-time whenever reconfiguration of available URAs 130 is needed. In some embodiments, MURI 154 does not make any assumption on how and/or when the reconfigurable MD 110 will detect a need for the reconfiguration. Extension of the Administrative Services of MURI 154 to include software update functionality is shown in and described with respect to FIG. 3, below.

Figure 3:
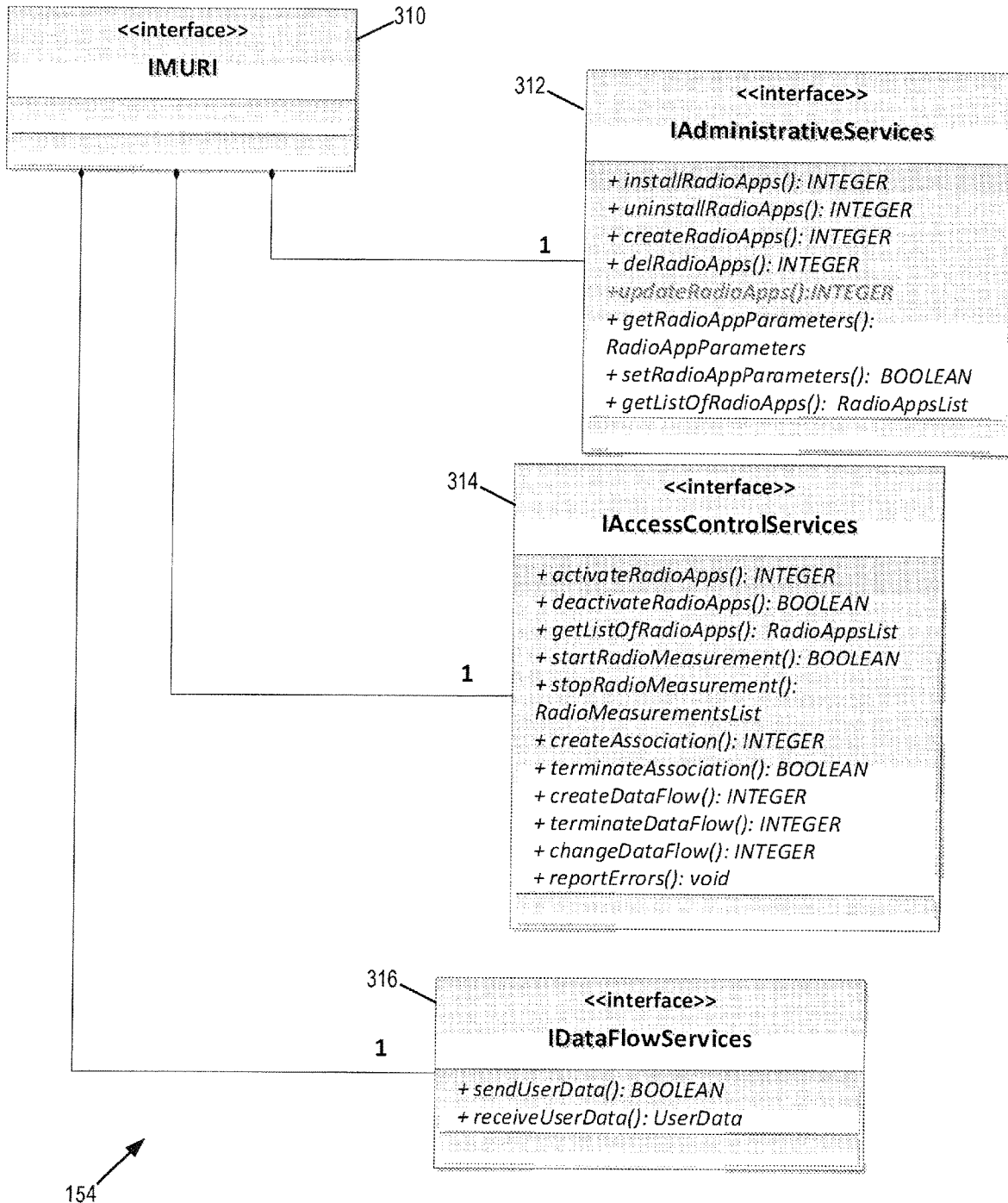
FIG. 3 is a diagram of a UML diagram for MURI Administrative Services that includes a software update functionality in accordance with one or more embodiments.

Referring now to FIG. 3, a diagram of a Unified Modeling Language (UML) diagram for MURI Administrative Services that includes a software update functionality in accordance with one or more embodiments will be discussed. In one or more embodiments, Multiradio Interface (MURI) 154 includes an interface 312 to the MURI (IMURI), an interface "IAdminstrativeServices" 312 to the Administrative Services 212, an interface "IAccessControlServices" 314 to the Access Control Services 214, and an interface "IDataFlow-Services" 316 to the Data Flow Services 216. The interface "IAdminstrativeServices" 312 to the Administrative Services 212 may be modified to include software update functionality by adding "UpdateRadioApp"+updateRadio-Apps( ):INTEGER. Furthermore, Chapter 8.2 of European Telecommunications Standards Institute (ETSI) European Norm (EN) 303 146-1 may be modified as follows to include the following Updating instance of URA as shown in underlining bel ow.

8.2.1 Overview on Administrative Services

Table 8.1 describes an overview on Administrative Services which are associated with Administrator. Class definition and related operations are described in clause 8.5.

TABLE 8.1

Overview on Administrative Services

| Administrative Services | Explanation |
| --- | --- |
| installation/uninstallation of URA | Reconfigurable MD described in the present document sets up its configuration through software download and installation. For the support of MD reconfiguration, Administrator requests installation/uninstallation of |

TABLE 8.1-continued

Overview on Administrative Services

| Administrative Services | Explanation |
| --- | --- |
| | URA to CM. |
| creating instance of URA | For activating the installed URA(s), instance(s) of the corresponding URA(s) has (have) to be created. Administrator requests CM to create instance(s) of the corresponding URA(s). CM creates the instance(s) and returns the confirmation of the instance creation to Administrator, when CM Judges the instance(s) creation is valid. |
| deleting instance of URA | Since the instance(s) of instantiated URA(s) occupies (occupy) the memory resources of the Reconfigurable MD, it might be desired to delete URA(s) instance(s) that is (are) not needed. Administrator requests CM to delete instance(s) of such URA(s). |
| getting/configuring URA Parameters | Administrator requests CM to provide parameter(s) of URA(s) such as required computational/spectral resources, antenna ports, etc. in order to manage the created URA(s) instance(s). |
| Updating instance of URA | Instance(s) of (an) installed URA(s) is/are replaced, typically by a SW Update. During the replacement process, the configuration is maintained. |
| URA List | In reconfigurable MD, the status of URA(s) might be installed, instantiated, or activated. In order to manage each URA properly, Administrator requests CM to provide URA list which includes ID and name as well as the status of each URA. |

8.2.2 Messages for Administrative Services

The interfaces for Administrative Services are used to transmit the following messages:

From CSL to RCF:
  Request of installation/uninstallation of an URA
  Request of creating/deleting an instance of an URA
  Request of updating an instance of an URA
  Request of getting/configuring parameters of an URA
  Request of installed/instantiated/activated URA(s) list
From RCF to CSL:
  Confirmation of installation/uninstallation of URA
  Confirmation of the creation/deletion of a URA instance
  Confirmation of the updating of a URA instance
  Failure of URA installation/Uninstallation
  Failure of the creation/deletion of an URA instance
  Information of URA parameters
  URA(s) list retrieving Furthermore. Section 8.3 of ETSI EN 303 146-1 may be modified as shown with underlining as follows.

8.3.2 Messages for Access Control Services

The interfaces for Access Control Services are used to transmit the following messages:

From CSL to RCF:
  Request of activation/deactivation of an URA
  Request of update of an URA
  Request of installed/instantiated/activated URA(s) list
  Request of start/stop measurements for radio environment
  Request of measurements for MD capabilities
  Request for the creation of a data flow
  Request for the termination of a data flow
  Request for the creation of a network and logical radio link association
  Request for changing a data flow
From RCF to CSL:
  Confirmation of an URA activation/deactivation
  Confirmation of an URA update
  Confirmation of data flow creation
  Confirmation of data flow termination
  Confirmation of the creation of a network and logical radio link association
  Confirmation of changing a data flow
  Confirmation of starting radio environment measurements
  Failure of an URA activation/deactivation
  Failure of data flow creation
  Failure of data flow termination
  Failure of the creation of a network and logical association
  Failure of changing a data flow
  Failure of starting radio environment measurements
  URA(s) list retrieving
  Information related to the radio environment
  Information about MD capabilities
  Information about errors In addition, in one or more embodiments, the class definitions described in Chapter 8.5 of ETSI EN 303 146-1 may be modified as shown in underling as follows.

8.5 Class Definitions for Interface

Each interface class related to MURI can be defined using the template presented in clause 6.2 and in accordance with the UML® diagram of FIG. 3 which specifies the interface classes related to MURI. Tables 8.4 to 8.6 specify all the operations related to the three interface classes above described.

TABLE 8.4

IAdministrativeServices Class
ClassIAdministrativeServices

| | Return type: | Value type: |
| --- | --- | --- |
| This class describes interfaces supporting Administrative Services. | | |
| OPERATIONS | | |
| installRadioApps | INTEGER | public |
| This operation is related to the installation of an URA. | | |
| uninstallRadioApps | INTEGER | public |
| This operation is related to the uninstallation of an URA | | |

TABLE 8.4-continued

IAdministrativeServices Class
ClassIAdministrativeServices

| | Return type: | Value type: |
|---|---|---|
| updateRadioApps | INTEGER | public |
| This operation is related to the update of an URA | | |
| createRadioApps | INTEGER | public |
| This operation is related to the creation of an instance of an URA. | | |
| delRadioApps | INTEGER | public |
| This operation is related to the deletion of an instance of an URA. | | |
| getRadioAppParameters | RadioAppParameters | public |
| This operation is needed for retrieving URA parameters. | | |
| setRadioAppParameters | BOOLEAN | public |
| This operation is needed for setting URA parameters. | | |
| getListOfRadioApps | RadioAppsList | public |
| This operation is needed for getting a list of the installed/instantiated/activated URA(s). | | |

In accordance with one or more embodiments, the basic process to update a software component and/or a radio application of reconfigurable MD 110 may be as follows. Optionally, a user equipment (UE) or reconfigurable MD 110 receives an announcement of a new Software Component. The UE may accept or reject the new Software Component or may be forced to install the new software component replacing a previously installed version. A new Software Component, meant for replacing a previous version of the same software component, is downloaded to a target UE, for example through a peer-to-peer connection providing an update of a Software Component for a specific user only, through a point-to-multipoint connection providing an update of a Software Component for a group of specific users, or through a broadcast connection providing an update of a Software Component for all user. In some embodiments, a mixture of peer-to-peer and point-to-multipoint may be implemented, although the scope of the claimed subject matter is not limited in this respect.

The target UE then verifies if the Software Component is valid and authorized for installation. If the Software Component is identified to be not valid or no authorization for installation is given, then the procedure may be abandoned, and the existing version of the Software Component is kept. Alternatively, a verification procedure may occur before the downloading of a new Software Component such that Software Components are able to be downloaded to the target UE only if such Software Components qualify for being installed and/or used as an update of an existing Software Component. The updating procedure then may be initiated, replacing the previous version of the Software Component with the newly downloaded version of the new Software Component.

In one or more embodiments, the "updateRadioApps" operation may be applied to activate active URA Instances and to deactivate inactive URA Instances. In case that the URA Instance is active, the "updateRadioApps" service typically will first deactivate the concerned URA Instance, recover the configuration parameters, de-install the URA Instance, install the new RadioApp and create a new URA Instance, apply the previously saved configuration parameters to the new URA Instance such that the configuration remains and activates the updates URA Instance. It is also possible that the update service will only retain a sub-set of the configuration parameters or none of the configuration parameters, although the scope of the claimed subject matter is not limited in this respect.

It should be noted that ETSI European Norm (EN) 303 095 describes a SW Reconfiguration architecture that includes four distinct interfaces that are defined in EN 303 146-1, EN 303 146-2, EN 303 146-3, and EN 303 146-4 respectively. In accordance with one or more embodiments, EN 303 146-1 has been modified as discussed herein to provide the ability to update the software via a "Software Update" function of a reconfigurable MD 110 while preserving the parameters, or at feast a subset of the parameters, of a prior software configuration. It should be further noted that these standards described in EN 303 146-1, 146-2, 146-3, and 146-4 also may be utilized in automotive applications such as autonomous vehicles. For example, the ability to provide a software update for a reconfigurable mobile device 110 as described herein may be applicable to the replacement of one or more Radio Access Technology (RAT) sub-components of a Dedicated Short Range Communications (DSRC) such as defined by IEEE 802.11p for vehicular environments, for Cellular Vehicle-to-Everything (C-V2X) based on Third Generation Partnership Project (3GPP) standards such as a Long-Term Evolution (LTE) standard or the link, for example to update the code of a Unified Radio Application 130 in the case that a vulnerability is discovered. It should be noted, however, that these are merely example applications of the ability to provide a software update to a reconfigurable MD 110, and the scope of the claimed subject matter is not limited in these respects.

Figure 4:
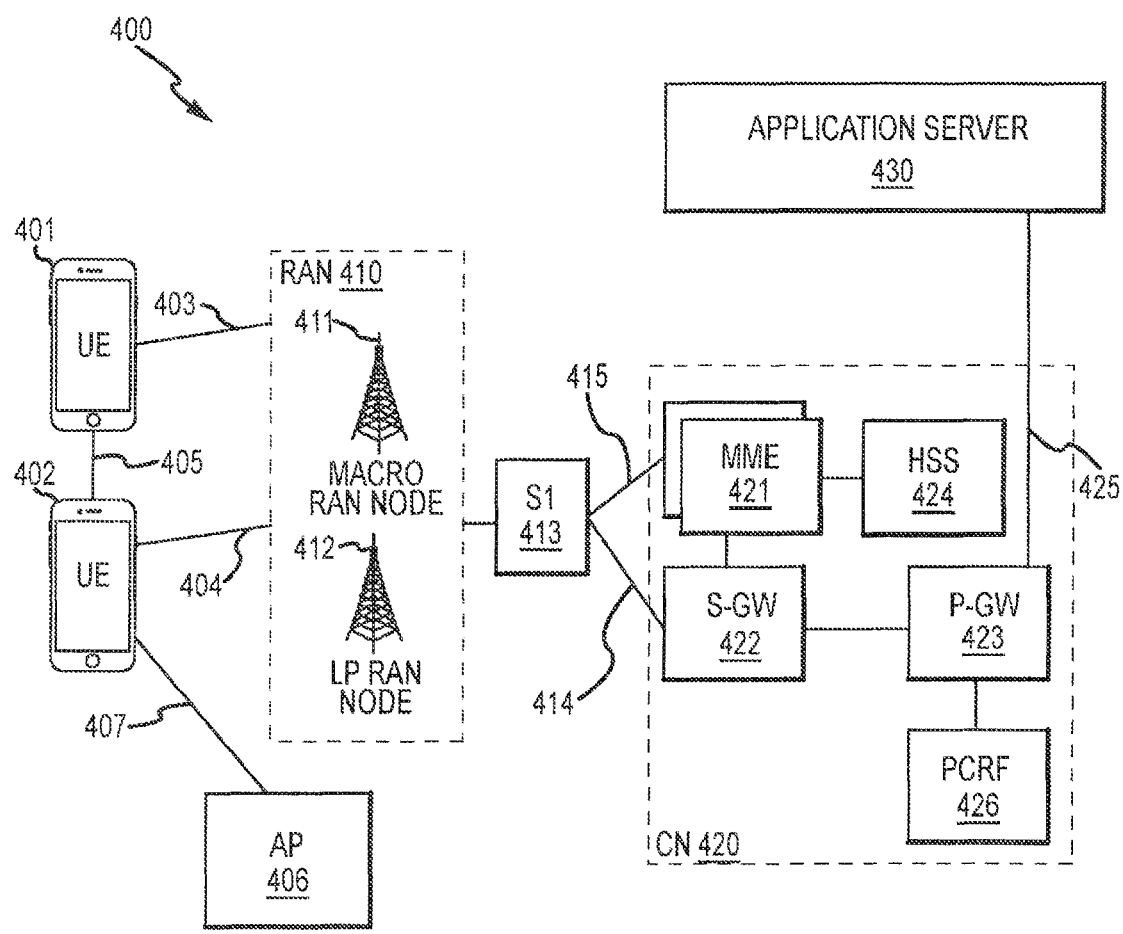
FIG. 4 illustrates an architecture of a system of a network in accordance with some embodiments.

Referring now FIG. 4, an architecture of a system of a network in accordance with some embodiments will be discussed. The system 400 is shown to include a user equipment (UE) 401 and a UE 402. The UEs 401 and 402 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

Any of the radio links or interfaces described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin. "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.).

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. i.e., some or all features defined for network equipment may be implemented by a UE.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413, In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The IISS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
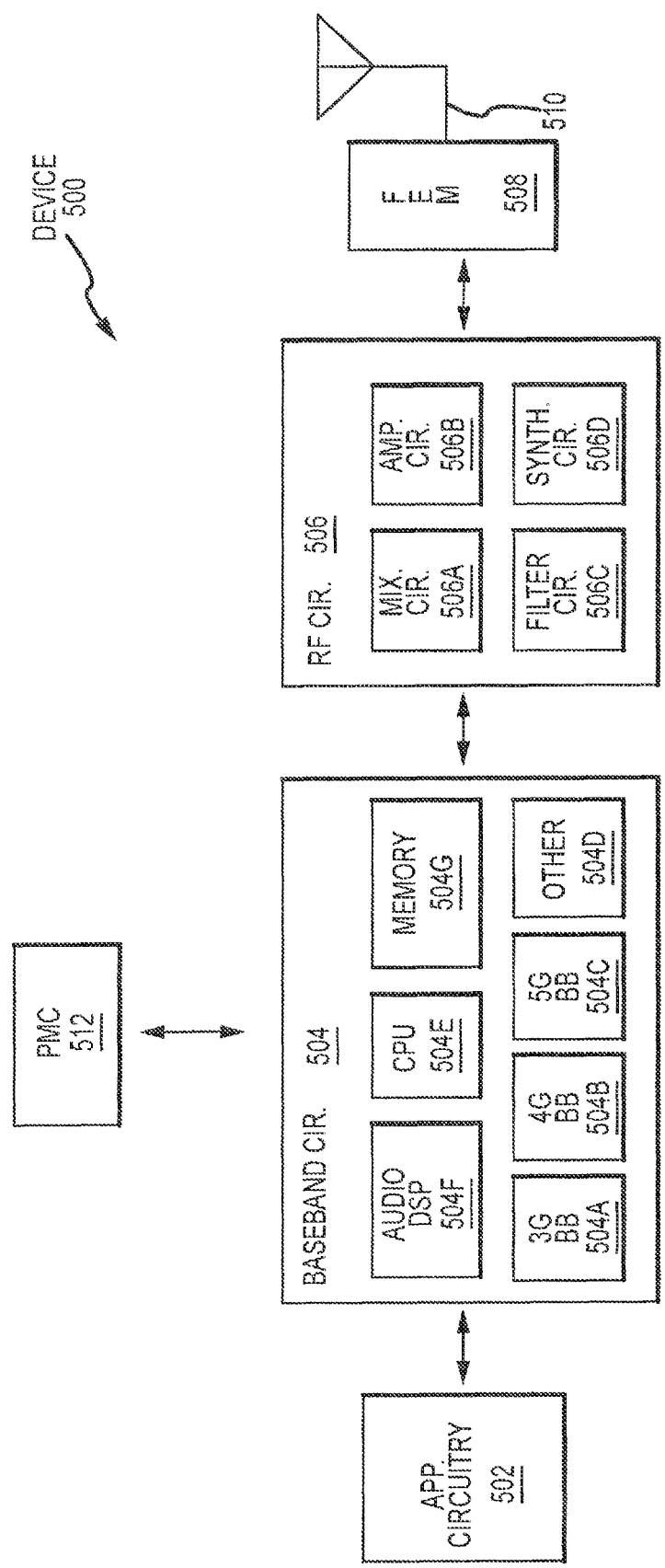
FIG. 5 illustrates example components of a device in accordance with some embodiments.

Referring now to FIG. 5, example components of a device in accordance with some embodiments will be discussed. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect. In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage-controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 5 12 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
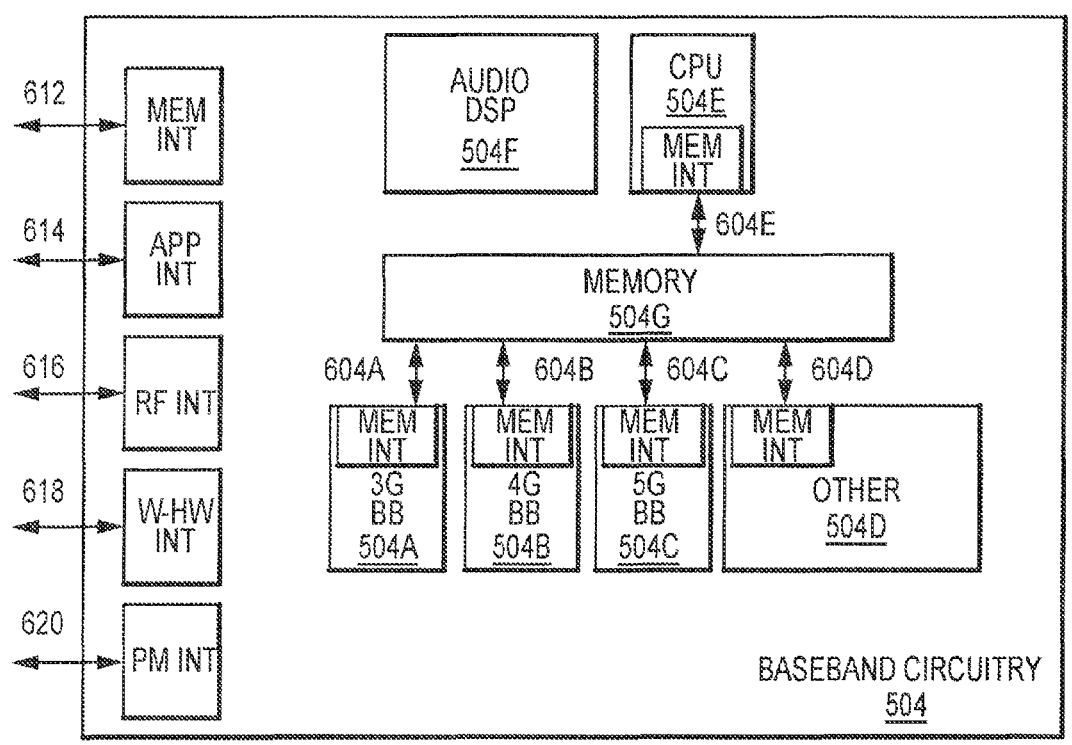
FIG. 6 illustrates example interfaces of baseband circuitry in accordance with some embodiments.

Referring now to FIG. 6, example interfaces of baseband circuitry in accordance with some embodiments will be discussed. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

The following are example implementations of the subject matter described herein. It should be noted that any of the examples and the variations thereof described herein may be used in any permutation or combination of any other one or more examples or variations, although the scope of the claimed subject matter is not limited in these respects.

In example one, an apparatus of a user equipment (UE) comprises a memory to store a Unified Radio Application and to store one or more configuration parameters for the Unified Radio Application, and one or more baseband processors to receive a radio application update from a remote server, and to update the Unified Radio Application via a Multiradio Interface (MURI) "updateRadioApps" operation with the received radio application update, wherein one or more of the configuration parameters are maintained in the memory after the update. Example two may include the subject matter of example one or any of the examples described herein, wherein the one or more baseband processors are to update an active instance of the Unified Radio Application. Example three may include the subject matter of example one or any of the examples described herein, wherein the one or more baseband processors are to update an inactive instance of the Unified Radio Application. Example four may include the subject matter of example one or any of the examples described herein, wherein the one or more baseband processors are to deactivate an instance of the Unified Radio Application, recover the configuration parameters, de-install the instance of the Unified Radio Application, install the Radio Application, create a new instance of the Unified Radio Application, and apply one or more of the configuration parameters stored in the memory. Example five may include the subject matter of example one or any of the examples described herein, wherein the one or more baseband processors are to apply all of the configuration parameters to the Unified Radio Application after the update. Example six may include the subject matter of example one or any of the examples described herein, wherein the one or more baseband processors are to apply a subset of the configuration parameters to the Unified Radio Application after the update. Example seven may include the subject matter of example one or any of the examples described herein, wherein the one or more baseband processors are to apply none of the configuration parameters to the Unified Radio Application after the update. Example eight may include the subject matter of example one or any of the examples described herein, wherein the "updateRadioApps" operation is handled by an Administrative Services function of the MURI.

In example nine, an apparatus of an autonomous vehicle comprises a memory to store a Unified Radio Application and to store one or more configuration parameters for the Unified Radio Application, and one or more field-programmable gate arrays (FPGAs) to receive a radio application update from a remote server, and to update the Unified Radio Application via a Multiradio Interface (MURI) "updateRadioApps" operation with the received radio application update, wherein one or more of the configuration parameters are maintained in the memory after the update. Example ten may include the subject matter of example nine or any of the examples described herein, wherein the one or more FPGAs are to update an active instance of the Unified Radio Application. Example eleven may include the subject matter of example nine or any of the examples described herein, wherein the one or more FPGAs are to update an inactive instance of the Unified Radio Application. Example twelve may include the subject matter of example nine or any of the examples described herein, wherein the one or more FPGAs are to deactivate an instance of the Unified Radio Application, recover the configuration parameters, de-install the instance of the Unified Radio Application, install the Radio Application, create a new instance of the Unified Radio Application, and apply one or more of the configuration parameters stored in the memory. Example thirteen may include the subject matter of example nine or any of the examples described herein, wherein the one or more FPGAs are to apply all of the configuration parameters to the Unified Radio Application after the update. Example fourteen may include the subject matter of example nine or any of the examples described herein, wherein the one or more FPGAs are to apply a subset of the configuration parameters to the Unified Radio Application after the update. Example fifteen may include the subject matter of example nine or any of the examples described herein, wherein the one or more FPGAs are to apply none of the configuration parameters to the Unified Radio Application after the update. Example sixteen may include the subject matter of example nine or any of the examples described herein, wherein the "updateRadioApps" operation is handled by an Administrative Services function of the MURI.

In example seventeen, one or more machine-readable media have instructions stored thereon that, when executed by a reconfigurable mobile device, result in storing a Unified Radio Application, storing one or more configuration parameters for the Unified Radio Application, receiving a radio application update from a remote server, and updating the Unified Radio Application via a Multiradio Interface (MURI) "updateRadioApps" operation with the received radio application update, wherein one or more of the configuration parameters are maintained after the update. Example eighteen may include the subject matter of example seventeen or any of the examples described herein, wherein the instructions, when executed, further result in updating an active instance of the Unified Radio Application. Example nineteen may include the subject matter of example seventeen or any of the examples described herein, wherein the instructions, when executed, further result in updating an inactive instance of the Unified Radio Application. Example twenty may include the subject matter of example seventeen or any of the examples described herein, wherein the instructions, when executed, further result in deactivating an instance of the Unified Radio Application, recovering the configuration parameters, de-installing the instance of the Unified Radio Application, installing the Radio Application, creating a new instance of the Unified Radio Application, and applying one or more of the configuration parameters stored in the memory. Example twenty-one may include the subject matter of example seventeen or any of the examples described herein, wherein the instructions, when executed, further result in applying all of the configuration parameters to the Unified Radio Application after the update. Example twenty-two may include the subject matter of example seventeen or any of the examples described herein, wherein the instructions, when executed, further result in applying a subset of the configuration parameters to the Unified Radio Application after the update. Example twenty-three may include the subject matter of example seventeen or any of the examples described herein, wherein the instructions, when executed, further result in applying none of the configuration parameters to the Unified Radio Application after the update. Example twenty-four may include the subject matter of example seventeen or any of the examples described herein, wherein the "updateRadioApps" operation is handled by an Administrative Services function of the MURI.

In example twenty-five, an apparatus of a user equipment (UE) comprises a radio-frequency (RF) transceiver having one or more radio components realized by software, a memory to store a first software component of the RF transceiver, and one or more processors to download a new software component, wherein the one or more processors are to update the first software component with the new software component when the new software component is verified as valid. Example twenty-six may include the subject matter of example twenty-five or any of the examples described herein, wherein the one or more processors are to receive a notification of the new software component, and to accept or reject whether to download the new software component. Example twenty-seven may include the subject matter of example twenty-five or any of the examples described herein, wherein the one or more processors are to verify whether the new software component is valid prior to downloading the new software component, or after downloading the new software component and prior to updating the first software component with the software component. Example twenty-eight may include the subject matter of example twenty-five or any of the examples described herein, wherein the new software component is a mandatory update to the first software component. Example twenty-nine may include the subject matter of example twenty-five or any of the examples described herein, wherein the one or more processors are to download the new software component via a peer-to-peer connection to provide an update for a specific user, via a point-to-multipoint connection to provide an update for a group of specific users, or via a broadcast connection to provide an update for all users, or a combination of peer-to-peer and point-to-multipoint. Example thirty may include the subject matter of example twenty-five or any of the examples described herein, wherein the one or more processors are to abandon the update, and to keep the first software component, when the new software is not verified as valid, or when the update is not authorized.

In the description herein and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description herein and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to multiradio interface for software reconfiguration and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
a memory to store an installed Unified Radio Application and to store one or more configuration parameters for the Unified Radio Application; and
one or more baseband processors configured to perform operations, the operations comprising:
triggering a Multiradio Interface (MURI) "createRadioApps" operation, wherein the "createRadioApps" operation is handled by an Administrative Services function of the MURI and comprises:
transmitting, from a communication service layer (CSL) to a radio control framework (RCF), a request of creating an instance of the installed Unified Radio Application;
creating the instance of the installed Unified Radio Application; and
transmitting, from the RCF to the CSL, a confirmation of the creation of the instance of the installed Unified Radio Application;
receiving a radio application update from a remote server configured to update the instance of the installed Unified Radio Application via a MURI "updateRadioApps" operation with the received radio application update, wherein the "updateRadioApps" operation is handled by the Administrative Services function of the MURI and comprises:
transmitting, from the CSL to the RCF, a request of updating the instance of the installed Unified Radio Application;
replacing the instance of the installed Unified Radio Application, wherein during the replacement process, the one or more configuration parameters for the installed Unified Radio Application are maintained, wherein the one or more baseband processors are to apply a subset of the one or more configuration parameters to the instance of the installed Unified Radio Application after the update; and transmitting, from the RCF to the CSL, a confirmation of the updating of the instance of the installed Unified Radio Application.

2. The apparatus of claim 1, wherein the instance of the installed Unified Radio Application is an active instance of the installed Unified Radio Application.

3. The apparatus of claim 1, wherein the instance of the installed Unified Radio Application is an inactive instance of the installed Unified Radio Application.

4. The apparatus of claim 1, wherein the one or more baseband processors are to deactivate the instance of the installed Unified Radio Application, recover the one or more configuration parameters, de-install the instance of the installed Unified Radio Application, create a new instance of the installed Unified Radio Application, and apply one or more of the configuration parameters stored in the memory.

5. An apparatus of an autonomous vehicle, comprising:
a memory to store an installed Unified Radio Application and to store one or more configuration parameters for the installed Unified Radio Application; and
one or more field-programmable gate arrays (FPGAs) configured to perform operations, the operations comprising:
triggering a Multiradio Interface (MURI) "createRadioApps" operation, wherein the "createRadioApps" operation is handled by an Administrative Services function of the MURI and comprises:
transmitting, from a communication service layer (CSL) to a radio control framework (RCF), a request of creating an instance of the installed Unified Radio Application;
creating the instance of the installed Unified Radio Application; and
transmitting, from the RCF to the CSL, a confirmation of the creation of the instance of the installed Unified Radio Application;
receiving a radio application update from a remote server configured to update the instance of the installed Unified Radio Application via a MURI "updateRadioApps" operation with the received radio application update, wherein the "updateRadioApps" operation is handled by the Administrative Services function of the MURI and comprises:
transmitting, from the CSL to the RCF, a request of updating the instance of the installed Unified Radio Application;
replacing the instance of the installed Unified Radio Application, wherein during the replacement process, the one or more configuration parameters for the installed Unified Radio Application are maintained, wherein the one or more FPGAs are to apply a subset of the one or more configuration parameters to the instance of the installed Unified Radio Application after the update; and
transmitting, from the RCF to the CSL, a confirmation of the updating of the instance of the installed Unified Radio Application.

6. The apparatus of claim 5, wherein the instance of the installed Unified Radio Application is an active instance of the installed Unified Radio Application.

7. The apparatus of claim 5, wherein the instance of the installed Unified Radio Application is an inactive instance of the installed Unified Radio Application.

8. The apparatus of claim 5, wherein the one or more FPGAs are to deactivate the instance of the installed Unified Radio Application, recover the one or more configuration parameters, de-install the instance of the installed Unified Radio Application, create a new instance of the installed Unified Radio Application, and apply the one or more of the configuration parameters stored in the memory.

9. A non-transitory computer-readable storage medium having instructions stored thereon, the instructions, when executed by one or more processors, cause the one or more processors to perform operations, comprising:
storing an installed Unified Radio Application;
storing one or more configuration parameters for the installed Unified Radio Application;
triggering a Multiradio Interface (MURI) "createRadioApps" operation, wherein the "createRadioApps" operation is handled by an Administrative Services function of the MURI and comprises:
transmitting, from a communication service layer (CSL) to a radio control framework (RCF), a request of creating an instance of the installed Unified Radio Application;
creating the instance of the installed Unified Radio Application; and
transmitting, from the RCF to the CSL, a confirmation of the creation of the instance of the installed Unified Radio Application;
receiving a radio application update from a remote server; and
updating the instance of the installed Unified Radio Application via a MURI "updateRadioApps" operation with the received radio application update, wherein the "updateRadioApps" operation is handled by the Administrative Services function of the MURI and comprises:
transmitting, from the CSL to the RCF, a request of updating the instance of the installed Unified Radio Application;
replacing the instance of the installed Unified Radio Application, wherein during the replacement process, the one or more configuration parameters for the installed Unified Radio Application are maintained, wherein a subset of the one or more configuration parameters are applied to the instance of the installed Unified Radio Application after the update; and
transmitting, from the RCF to the CSL, a confirmation of the updating of the instance of the installed Unified Radio Application.

10. The non-transitory computer-readable storage medium of claim 9, wherein the instance of the installed Unified Radio Application is an active instance of the installed Unified Radio Application.

11. The non-transitory computer-readable storage medium of claim 9, wherein the instance of the installed Unified Radio Application is an inactive instance of the installed Unified Radio Application.

12. The non-transitory computer-readable storage medium of claim 9, wherein the instructions, when executed, further result in:
deactivating the instance of the installed Unified Radio Application;
recovering the one or more configuration parameters;

de-installing the instance of the installed Unified Radio Application;
creating a new instance of the installed Unified Radio Application; and
applying the one or more of the configuration parameters stored in the memory.

\* \* \* \* \*